(12) United States Patent
Bole-Feysot et al.

(10) Patent No.: US 11,913,489 B2
(45) Date of Patent: Feb. 27, 2024

(54) DECORATIVE ARTICLE WITH INTERLOCKING SYSTEM

(71) Applicant: Cartier International AG, Steinhausen (CH)

(72) Inventors: Marc Bole-Feysot, Montlebon (FR); Franck Dumont, Valdahon (FR); Sebastien Jeannier, Vercel-Vil-Ledieu-le-Camp (FR)

(73) Assignee: Cartier International AG, Steinhausen (CH)

( * ) Notice: Subject to any disclaimer, the term of this patent is extended or adjusted under 35 U.S.C. 154(b) by 0 days.

(21) Appl. No.: 18/257,906

(22) PCT Filed: Jul. 20, 2021

(86) PCT No.: PCT/EP2021/070280
§ 371 (c)(1),
(2) Date: Jun. 16, 2023

(87) PCT Pub. No.: WO2022/128176
PCT Pub. Date: Jun. 23, 2022

(65) Prior Publication Data
US 2024/0003377 A1  Jan. 4, 2024

(30) Foreign Application Priority Data
Dec. 18, 2020 (EP) .................................... 20215801

(51) Int. Cl.
*A44C 5/12* (2006.01)
*F16B 39/32* (2006.01)
*F16B 39/28* (2006.01)

(52) U.S. Cl.
CPC ................ *F16B 39/32* (2013.01); *A44C 5/12* (2013.01); *F16B 39/28* (2013.01)

(58) Field of Classification Search
CPC .......... A44C 5/12; A44C 5/2009–2061; A44C 5/2071; A44C 5/2076; A44C 9/0038;
(Continued)

(56) References Cited

U.S. PATENT DOCUMENTS 2,553,889 A    5/1951  Batdorf
5,155,893 A *  10/1992 Nussberger .......... A44C 5/2061
                                                    24/616

(Continued)

FOREIGN PATENT DOCUMENTS

CH          709021 A2    6/2015
CN       110645256 A     1/2020
(Continued)

OTHER PUBLICATIONS

International Search Report and Written Opinion dated Oct. 14, 2021 for PCT/EP2021/070280, 6 pages.

(Continued)

*Primary Examiner* — Roberta S Delisle
(74) *Attorney, Agent, or Firm* — Vorys, Sater, Seymour and Pease LLP; Rex W. Miller, II

(57) ABSTRACT

The invention relates to a decorative article with a system (7) for interlocking two portions (5, 6) of at least one part (3, 4), comprising a screw (8) and nut (9) assembly which passes through each portion (5, 6) and is intended to press the two portions (5, 6) against each other by screwing. According to the invention, the interlocking system (7) comprises a flexible safety device (13) so that the screw (8) and nut (9) assembly can continue to be screwed and unscrewed whilst elastically preventing relative displacement between the screw (8) and the nut (9) below a predetermined torque.

17 Claims, 3 Drawing Sheets

(58) Field of Classification Search
CPC ... A44C 15/003; A44C 15/0055; A44C 19/00; F16B 39/28; F16B 39/32
USPC ............ 63/1.11, 1.18, 3.1, 24; 411/89
See application file for complete search history.

(56) References Cited

U.S. PATENT DOCUMENTS

| | | | |
|---|---|---|---|
| 6,102,639 | A | 8/2000 | DiStasio |
| 6,227,782 | B1 | 5/2001 | Bowling et al. |
| 9,326,569 | B1* | 5/2016 | Cipolla ................ A44C 5/2076 |
| 2011/0174239 | A1 | 7/2011 | Fricker et al. |
| 2016/0183644 | A1* | 6/2016 | Gibbs .................... A44C 5/185 24/615 |
| 2019/0249458 | A1* | 8/2019 | Lin ......................... E05B 17/20 |

FOREIGN PATENT DOCUMENTS

| | | |
|---|---|---|
| CN | 21027616 U | 4/2020 |
| CN | 210227148 U | 4/2020 |
| DE | 102010024870 A1 | 12/2011 |
| EP | 2362108 A2 | 8/2011 |
| EP | 3590372 A1 | 1/2020 |
| FR | 1345897 A | 12/1963 |
| GB | 190922485 A | 6/1910 |
| JP | S60-023617 | 2/1985 |
| JP | S60-044614 U | 3/1985 |
| JP | H07-197925 A | 8/1995 |
| JP | 2018513319 A | 5/2018 |
| WO | 2011160746 A1 | 12/2011 |
| WO | 2014144124 A1 | 9/2014 |
| WO | 2016168589 A1 | 10/2016 |

OTHER PUBLICATIONS

Office Action issued by China National Intellectual Property Administration dated Oct. 12, 2023, in application No. 202180083987.6, 6 pages.

Notice of Reasons for Rejection issued by Japan Patent Office dated Dec. 15, 2023, in application No. 2023-535722, 9 pages.

* cited by examiner

DECORATIVE ARTICLE WITH INTERLOCKING SYSTEM

CROSS-REFERENCE TO RELATED APPLICATIONS

This application is a national stage of International Patent Application PCT/EP2021/070280 filed Jul. 20, 2021, which claims priority to European Union Patent Application No. 20215801.0 filed Dec. 18, 2020, which are incorporated by reference herein in their entirety.

TECHNICAL FIELD OF THE INVENTION

This invention relates to a system for interlocking two portions of at least one part forming all or some of a decorative article such as a jewellery article and in particular such portions preferably having corresponding shapes.

TECHNICAL BACKGROUND OF THE INVENTION

In the field of jewellery in particular, screw and nut assemblies can be used, for example, to close a necklace or a bracelet. For such applications, it must be possible to screw and unscrew the screw and nut assemblies many times in order to take the jewel off the user to clean it or change it regularly.

It has been observed that this reversible closure could lead to untimely unscrewing and thus the accidental loss of all or part of the jewel. In addition, if the materials used are made of precious metal such as gold for example, the mechanical properties of this category of materials are more prone to unscrew (elastic limit, Young's modulus, creep, hardness, etc.).

SUMMARY OF THE INVENTION

The invention aims to provide a decorative article with a system for interlocking two portions of at least one part forming for example a decorative article such as a jewellery article, of which each screw and nut assembly can continue to be screwed and unscrewed regularly while avoiding, or at least limiting, however, the accidental unscrewing of the screw and nut assembly to prevent the user from losing all or part of the part forming the decorative article without noticing.

To this end, the invention relates to a decorative article comprising at least two portions of at least one part intended to be coupled together in order to be attached to a user, characterised in that the decorative article comprises an interlocking system comprising a screw and nut assembly which passes through each portion and is intended to press the two portions against each other by screwing, and in that the interlocking system comprises a flexible safety device so that the screw and nut assembly can continue to be screwed and unscrewed whilst elastically preventing relative displacement between the screw and the nut below a predetermined torque.

Advantageously according to the invention, the flexible safety device prevents the user's movements from accidentally unscrewing the screw and nut assembly. Advantageously, the flexible safety device always allows the reversible closure and, in addition, the screw can therefore advantageously be unscrewed only when the user really wants to, using a tool such as, for example, a screwdriver.

It therefore becomes less important to press the portions against each other with sufficient force, which avoids damaging the tapping of the nut and/or the thread of the screw by exerting excessive torque for fear of losing the decorative article. Furthermore, in the case of a precious metal such as gold, such an excessive torque also increases the risk of damaging the head of the screw, or even marking the areas around the screw if the screwdriver accidentally slips out of the head of the screw.

The invention may further comprise one or more of the following optional characteristics, taken alone or in combination.

The flexible safety device preferably comprises at least one toothing and flexible catch assembly mounted between the screw and the nut in order to provide a plurality of discrete relative positions in which relative displacement is prevented between the screw and the nut below a predetermined torque. It is also understood that, when screwing and unscrewing, the user will feel successive stable positions allowing them to be more aware of the rotational amplitude induced on the screw.

According to an alternative, the toothing is formed on the nut and the flexible catch is secured to the screw, or conversely, the toothing is formed on the screw and the flexible catch is secured to the nut.

According to the first part of the alternative, the toothing extends, preferably, circumferentially coaxially with the tapping of the nut and the flexible catch is mounted on the free end of the screw in the extension of the thread. More precisely, the flexible catch can for example be attached to the screw so as to rotate with the screw.

According to the second part of the alternative, the toothing extends, preferably, circumferentially coaxially with the thread of the screw and the flexible catch is mounted protruding from the tapping of the nut. More precisely, the flexible catch can for example be attached to the nut so as to rotate with the nut.

Each toothing and flexible catch assembly may comprise a single toothing cooperating with several flexible catchs at the same time so as to elastically block the assembly over several teeth of the toothing. Depending on the geometry of the toothing and flexible catch assembly, the predetermined torque in the screwing direction can be less than, equal to or greater than that in the unscrewing direction. Preferably, the predetermined torque in the screwing direction is less than that in the unscrewing direction.

The flexible safety device, below a predetermined torque, can be configured so as to elastically maintain the position of the screw with respect to that of the nut in the unscrewing direction. The predetermined torque in the unscrewing direction can be less than 10 N mm, preferably less than 8 N mm and, even more preferably, less than 5 N mm, in other words for example in particular equal to 9 N mm, 8 N mm, 7 N mm, 6 N mm, b 5 N mm, 4 N mm, 3 N mm, 2 N mm or 1 N mm.

The flexible safety device, above a predetermined torque, can be configured so as to allow the displacement of the screw with respect to that of the nut in the screwing direction. The predetermined torque in the screwing direction can be greater than 1 N mm, preferably greater than 3 N mm and, even more preferably, greater than 4 N mm, in other words for example in particular equal to 1.5 N mm, 2 N mm, 2.5 N mm, 3 N mm, 3.5 N mm, 4 N mm, 4.5 N mm, 5 N mm, 5.5 N mm, 6 N mm, 6.5 N mm or 7 N mm.

The predetermined torque of the flexible safety device in the screwing direction can be equal to that in the unscrewing direction in order to provide an identical or similar force to tighten or loosen the two portions with respect to each other.

The flexible safety device can be active at different screwing penetrations of the screw and nut assembly in the screwing direction and/or in the unscrewing direction, which allows the user to choose the force with which the two portions are pressed against each other without the risk of losing all or some of the part forming the decorative article.

The interlocking system and/or of the decorative article can be made entirely or partially of a material based on at least one precious metal. The precious metal can thus be gold or platinum. As a non-limiting example, the screw and/or the nut and/or the toothing and/or the flexible catch could be made of a material based on a precious metal (or one of its alloys).

Lastly, the decorative article can be a bracelet, such as a piece of jewellery or fine jewellery.

BRIEF DESCRIPTION OF THE DRAWINGS

Other features and advantages of the invention will appear clearly on reading the description which follows, given by way of example and not limiting in any way, referring to the attached drawings, in which.

DETAILED DESCRIPTION OF AT LEAST ONE EMBODIMENT OF THE INVENTION

On the various figures, elements which are identical or similar have the same references, possibly with an index added. Their structures and functions are therefore not systematically described.

In the remainder of the document, the orientations are the orientations of the figures. In particular, the terms "upper", "lower", "left", "right", "above", "below", "forward" and "backward" generally mean with respect to the direction of representation of the figures.

"Leather goods article" means all types of article based on leather such as a bracelet, a bag, a belt, a saddle, for example for horse-riding, tack, for example for horse-riding, etc.

"Weaving article" means all types of article based on textile material such as a fabric, a bag, a garment, a bracelet, a belt, a parachute, etc.

"Jewellery article" means all types of decorative or ornamental article that may comprise a non-precious ceremonial stone such as a bracelet, a necklace, a belt, etc.

"Fine jewellery article" means all types of decorative or ornamental article that may include a precious or semi-precious stone such as a bracelet, a necklace, a belt, etc.

"Timepiece article" means all types of instrument for measuring or counting time such as clocks, small clocks, watches, etc.

"Based on" means a material or alloy forming at least 50% of the total mass or weight of a given element.

Figure 1:
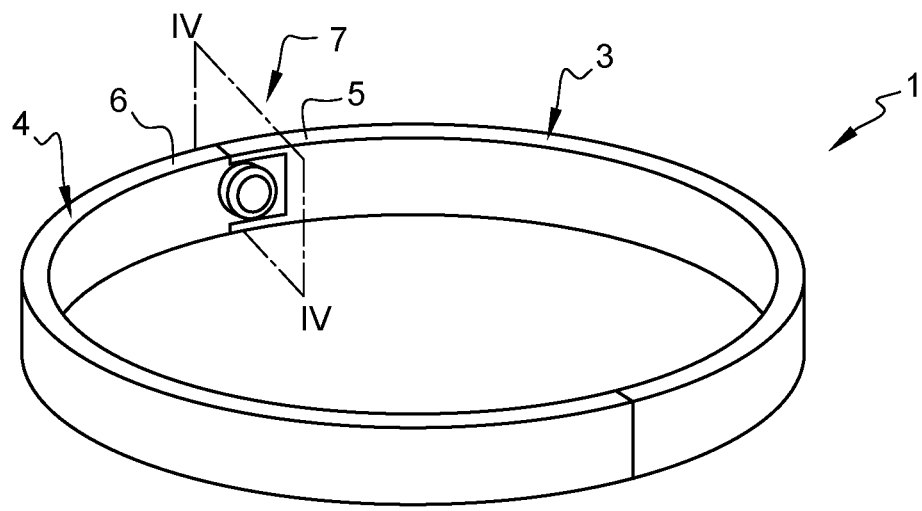
FIG. 1 is a schematic view of a decorative article that can comprise an interlocking system according to the invention.

The invention aims to provide a system 7 for interlocking two portions 5, 6 of at least one part 3, 4 forming an article 1 of the decorative type, such as a jewellery or fine jewellery article. It is therefore understood that the article 1 comprises one or more parts. In the example shown on FIG. 1, the decorative article 1 forms the bracelet of a jewellery article formed from two parts 3, 4, each in the form of half-rings made of precious metal. According to the invention, each pair of portions 5, 6 of the parts 3, 4 can comprise an interlocking system 7. In the example shown on FIG. 1, only one pair comprises the interlocking system 7, the second pair comprising an articulation with preferably a pivot-type connection.

Figure 6:
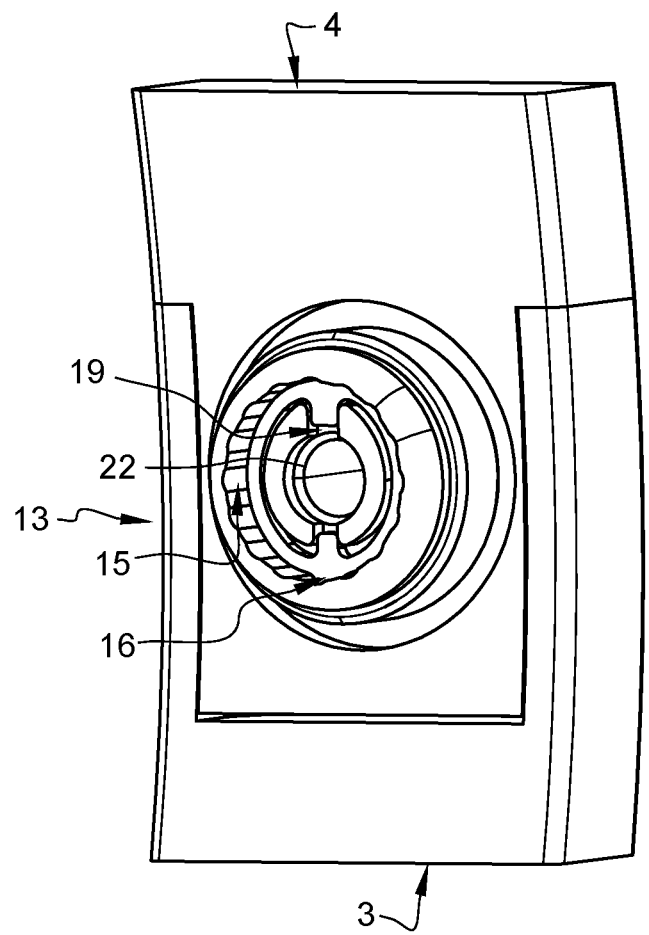
FIG. 6 is a partial perspective view of a decorative article having an interlocking system according to the invention that presses two portions together.

Consequently, at least the two portions 5, 6 are intended to be coupled together by the interlocking system 7 in order to attach the decorative article 1 to a user. More precisely, the interlocking system 7 comprises at least one screw 8 and nut 9 assembly intended to press the two portions 5, 6 against each other by screwing, as shown on FIGS. 4 and 6. In the example shown on FIGS. 2 to 6, it can be seen that the portions 5, 6 have complementary shapes intended to form a ring of constant section with the two parts 3, 4 fitted together including in the vicinity of the contact between the portions 5, 6.

Each screw 8 and nut 9 assembly passes through each portion 5, 6, in other words in particular the screw 8 passes through the holes 11, 12 of the portions 5, 6 and the nut 9 cannot cross the hole 11 of the portion 5, so that the portions 5, 6 can be pressed against each other. In the example shown on FIG. 4, we see that the nut 9 passes through the hole 12 of the portion 6 in order to screw the screw 8 and the nut 9 in the thickness of the part 4, in other words to reduce the thickness of the interlocking system 7 along the axis of rotation X of the screw 8.

Advantageously according to the invention, the interlocking system 7 comprises a resilient safety device 13 to elastically prevent relative displacement between the screw 8 and the nut 9 below a predetermined torque.

The flexible safety device 13 prevents in particular the user's movements from accidentally unscrewing the screw 8 and nut 9 assembly. More precisely, the flexible safety device 13, below a predetermined torque less than 10 N mm, preferably less than 8 N mm and, even more preferably, less than 5 N mm, in other words for example in particular equal to 9 N mm, 8 N mm, 7 N mm, 6 N mm, 5 N mm, 4 N mm, 3 N mm, 2 N mm or 1 N mm, can be used to elastically maintain the position of the screw 8 with respect to that of the nut 9 in the unscrewing direction. In addition, above a predetermined torque greater than 1 N mm, preferably greater than 3 N mm and, even more preferably, greater than 4 N mm, in other words for example in particular equal to 1.5 N mm, 2 N mm, 2.5 N mm, 3 N mm, 3.5 N mm, 4 N mm, 4.5 N mm, 5 N mm, 5.5 N mm, 6 N mm, 6.5 N mm or 7 N mm, the flexible safety device allows the displacement of the screw 8 with respect to that of the nut 9 in the screwing direction.

It is therefore understood that the predetermined torque in the screwing direction is preferably less than that in the unscrewing direction. However, the predetermined torque could be identical for screwing and unscrewing or the predetermined torque in the screwing direction could be greater than that in the unscrewing direction. The screw 8 can therefore advantageously be unscrewed only when the user really wants to, using a suitable tool such as, for example, a screwdriver (not shown). According to the invention, the flexible safety device 13 is active at different screwing penetrations of the screw 8 and nut 9 assembly in the screwing direction and/or in the unscrewing direction, which allows the user to choose the force with which the two portions 5, 6 are pressed against each other without the risk of losing all or some of the part forming the decorative article.

The screw 8 and/or the nut 9, like the parts 3, 4, can be made of a precious material such as one based on gold (or one of its alloys) and/or platinum (or one of its alloys). Preferably, the screw 8 and the nut 9 are made of a material based on at least one precious metal and, even more preferably, having the same composition as the parts 3, 4.

It is therefore understood that it becomes less important to press the portions 5, 6 against each other with sufficient force because the position of the screw 8 with respect to that of the nut 9 will be advantageously maintained by means of the flexible safety device 13. It appears immediately that damage to the tapping of the nut 9 and/or to the thread of the screw 8 can be avoided by not having to exert a particular torque that would be, for example, too excessive for fear of losing the decorative article 1. In addition, in the case of a precious metal such as gold, since such an excessive torque is avoided, the risk of damaging the head 18 of the screw 8 or of marking the portions 5, 6 around the screw 8 if the screwdriver accidentally slips out of the head 18 of the screw 8, is reduced.

The flexible safety device 13 preferably comprises at least one toothing 15 and flexible catch 16 assembly mounted between the screw 8 and the nut 9 in orderto provide a plurality of discrete relative positions for each of which relative displacement is prevented between the screw 8 and the nut 9 below a predetermined torque. It is also understood that, when screwing and unscrewing, the user will feel successive stable positions allowing them to be more aware of the rotational amplitude along the X axis induced on the screw 8. Depending on the geometry of the toothing 15 and flexible catch 16 assembly, the predetermined torque in the screwing direction can be less than, equal to or greater than that in the unscrewing direction. Preferably, the predetermined torque in the screwing direction is equal to that in the unscrewing direction in order to provide an identical or similar force to tighten or loosen the two portions 5, 6 with respect to each other.

In addition, the toothing 15 and/or the flexible catch 16 is preferably made of precious materials such as based on gold (or one of its alloys) and/or platinum (or one of its alloys). All combinations of precious and non-precious materials are also possible between the screw 8, the nut 9, the toothing 15 and the flexible catch 16. For example, in a non-limiting manner, only the screw 8 could be made of precious metal or all the above-mentioned components could be made of precious metal.

According to an alternative, the toothing 15 is formed on the nut 9 and the flexible catch 16 is secured to the screw 8, or conversely, the toothing 15 is formed on the screw 8 and the flexible catch 16 is secured to the nut 9.

According to the first part of the alternative, the toothing 15 is preferably formed coaxially with the tapping of the nut 9 and the flexible catch 16 is mounted on the free end of the screw 8 in the extension of the thread. More precisely, the flexible catch 16 can for example be attached to the screw 8 so as to rotate with the screw 8.

According to the second part of the alternative, the toothing 15 is preferably formed coaxially with the thread of the screw 8 and the resilient catch 16 is mounted protruding from the tapping of the nut 9. More precisely, the flexible catch 16 can for example be attached to the nut 9 so as to rotate with the nut 9.

To illustrate the invention more clearly, the first part of the alternative is shown on FIGS. 2 to 6. Thus, in the example of FIG. 5, the nut 9 has a generally annular shape whose outer diameter comprises a thread 17. The nut 9 further comprises on a first inner diameter, a tapping 10 intended to couple with the thread 14 of the screw 8 and in the extension along the axis of rotation X, on a second inner diameter, greater than the first inner diameter, the toothing 15 intended to couple with the flexible catch 16.

The axial width (along the X axis) of the toothing 15 allows the flexible safety device 13 to be active at different screwing penetrations of the screw 8 and nut 9 assembly in the screwing direction and/or in the unscrewing direction. Thus, since the flexible catch 16 is secured to the end of the screw 8, it will move "forward" or "backward" axially with respect to the toothing 15. Preferably, the axial width (along the X axis) of the toothing 15 is large enough to allow the flexible safety device 13 to be active at all screwing penetrations of the screw 8 and nut 9 assembly in the screwing direction and/or in the unscrewing direction between the position in which the two portions 5, 6 are pressed against each other shown on FIGS. 4 and 6 and the position beyond which the screw 8 can no longer be unscrewed any further from the nut 9 as explained below.

The screw 8 comprises a head 18 intended to act as a stop for the portion 5 to bring it closer to the portion 6. The screw 8 comprises, in the extension along the axis of rotation X, the thread 14 then, preferably at its end opposite the head 18, reception means 19 for receiving the flexible catch 16 so as to make the screw 8 integral in rotation with the flexible catch 16. In the example shown on FIGS. 2 to 6, the reception means 19 comprise two substantially vertical grooves. Obviously, the reception means 19 could differ in particular depending on the shape of the part receiving the flexible catch 16.

Figure 3:
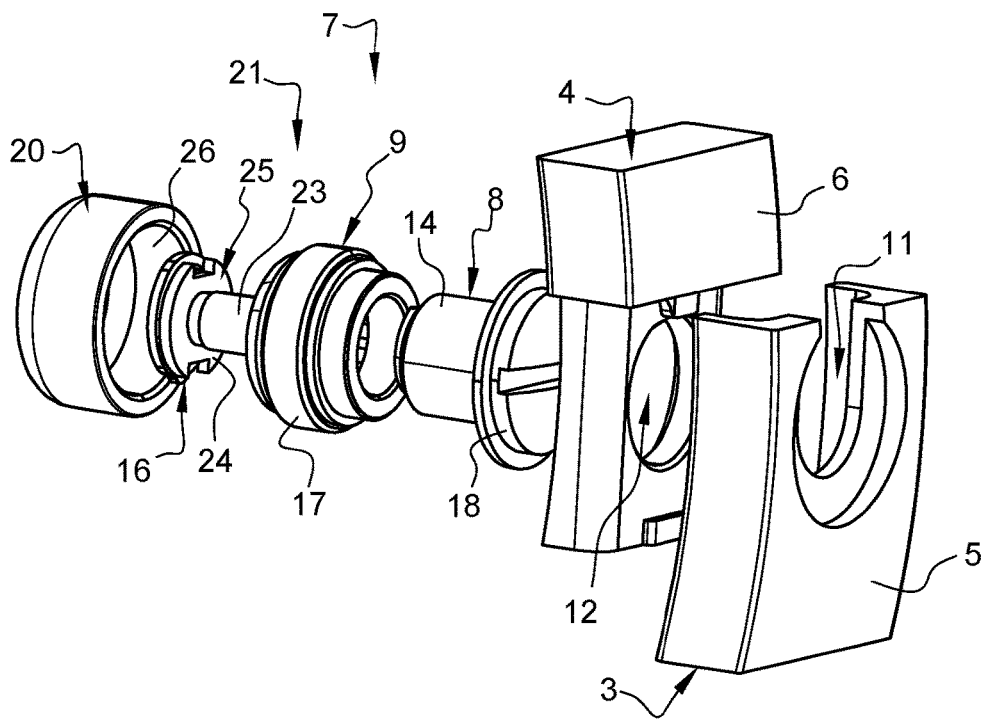
FIG. 3 is an exploded view of the interlocking system and of two portions to be pressed against each other (the positions of the various components not necessarily corresponding to their respective positions when the system is assembled)
Figure 4:
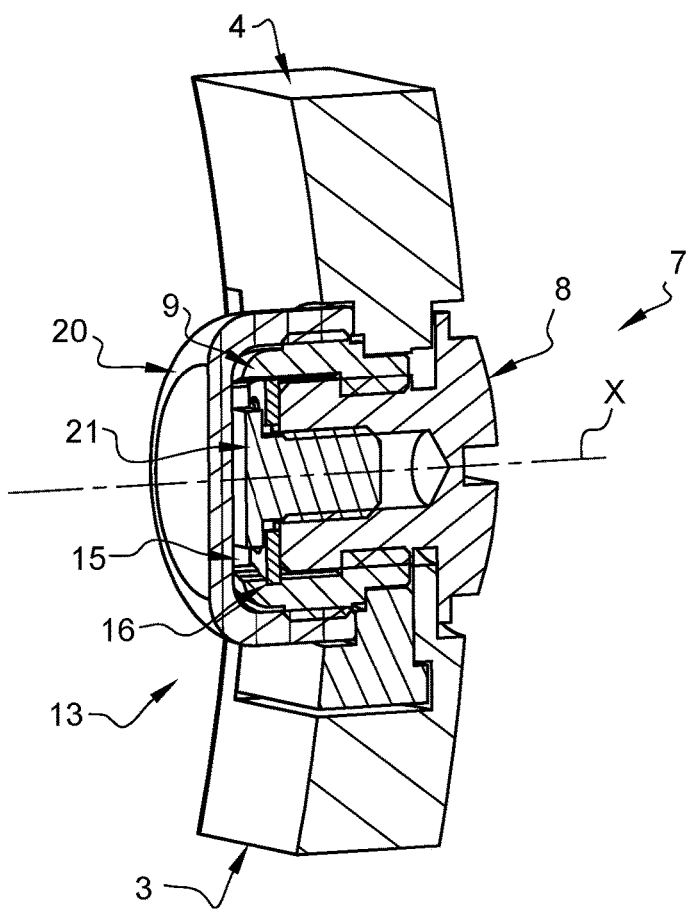
FIG. 4 is a cross-sectional view along plane IV-IV of FIG. 1.
Figure 5:
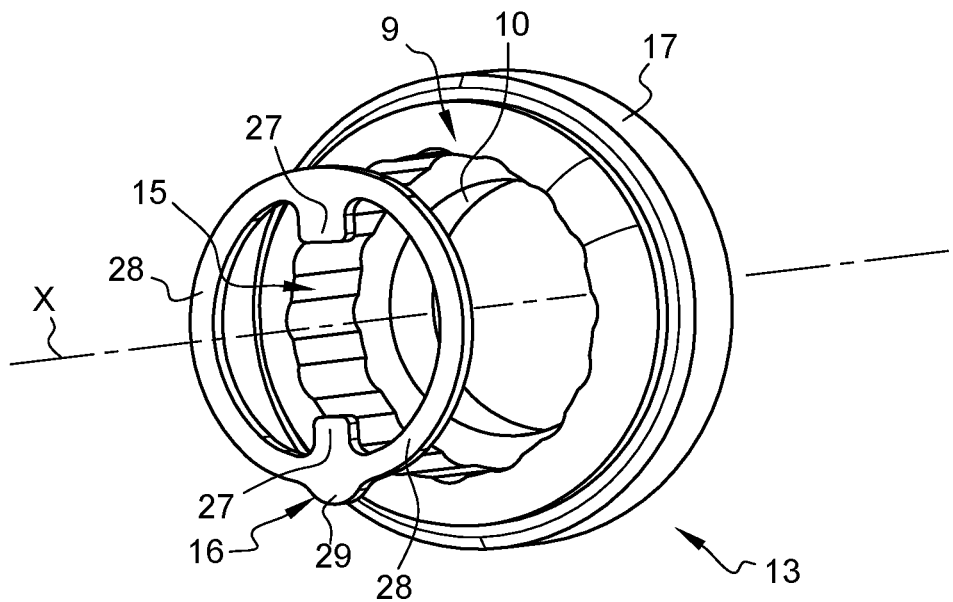
FIG. 5 is a perspective view of a toothing and flexible catch assembly of a flexible safety device according to the invention.

As shown on FIGS. 3 and 4, means 21 for retaining the flexible catch 16 against the screw 8 are also provided to guarantee that the flexible catch 16 remains inside the substantially cylindrical volume of the toothing 15. The retaining means 21 in the example shown on FIG. 6 comprise a tapping 22 in the screw 8 coaxially with the thread 14 in which a pin 25 is coupled. The latter comprises a thread 23 intended to engage with the tapping 22 so that the plate 24 of the pin 25 remains inside the substantially cylindrical volume of the toothing 15 by limiting the travel of the flexible catch 16 along the axis of rotation X. To make it easier to screw the pin 25 in the screw 8, we can see that two notches have been formed on the periphery of the plate 24. Obviously, the reception means 21 could differ in particular depending on the shape of the part receiving the flexible catch 16.

In the example shown on FIGS. 2 to 6, the flexible catch 16 is formed by a substantially annular part comprising two tenons 27 intended to be mounted in the reception means 19, typically by the substantially vertical grooves at the end of the screw 8. The two tenons 27 are connected together by two semi-annular flexible arms 28 intended to allow the tenons 27 to be moved closer to each other under stress, in particular by a displacement towards the axis of rotation X capable of moving the stop 29 of the flexible catch 16 away from the toothing 15. As shown on FIGS. 5 and 6, the tenons 27 used and, incidentally associated reception means 19, can be of different shapes (geometry, dimensions, etc.) so that only one assembly configuration is possible. Consequently, the tenons 27 can act as foolproofing devices (sometimes known by the Japanese term "poka-yoke") during assembly.

Obviously, the flexible catch 16 could differ, in particular depending on the shape of the toothing 15. The flexible catch 16 can thus be simpler than the substantially annular part of FIG. 5. It could thus be made in one piece with the end of the screw 8 (no longer requiring tenons 27 or reception means 19) and substantially comprise only one flexible arm 28 and the stop 29 like a timepiece jumper. Without being made in one piece, the flexible catch 16 could be substantially C-shaped (requiring the tenons 27 and the reception means 19) with a single flexible arm 28 provided at one end with a stop 29. Conversely, the flexible catch 16 could also be more complicated than the substantially annular part of FIG. 5.

In the example shown on FIGS. 2 to 6, we can also see that a cover 20 is provided to protect the user during contact with the interlocking system 7. As shown on FIGS. 3 and 4, the cover 20 may thus comprise a tapping 26 intended to couple with the thread 17 of the nut 9. The cover 20 can be a solid part in the shape of a bowl as shown on FIGS. 1 to 4. Obviously, the cover 20 could however, without departing from the scope of the invention, comprise an opening in order to be able to see at least a part of the interlocking system 7, such as the toothing 15 and flexible catch 16 assembly, while continuing to protect the user. Lastly, the interlocking system 7 could also have no cover 20 or thread 17 on the nut 9 without departing from the scope of the invention.

Figure 2:
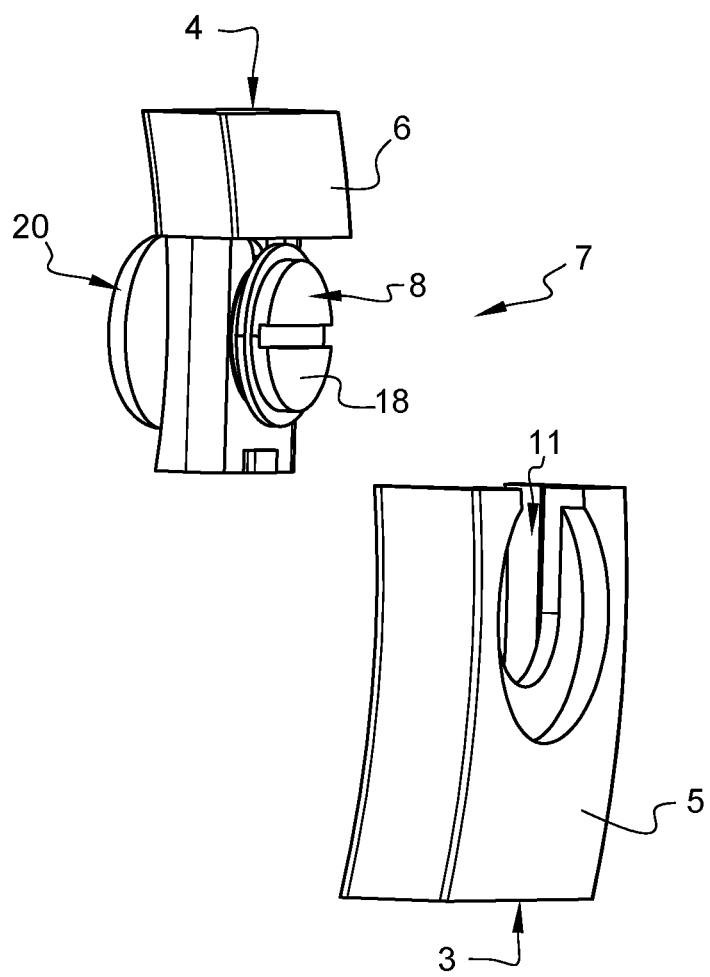
FIG. 2 is a perspective view of two portions of a part before blocking by an interlocking system according to the invention.

Consequently, in the position of FIG. 2, preferably, the screw 8 cannot be removed from the nut 9, in other words cooperate with a stop (not shown) beyond which it cannot be moved further away from the nut 9. In this position, after putting the decorative article 1 around their wrist for example, the user moves the two portions 5, 6 together so as to join, preferably by sliding, the portion 5 between the portion 6 and the head 18 of the screw 8 guided by the hole 11. The user can then, advantageously according to the invention, screw the screw 8 using for example a screwdriver engaged in a shape, such as a notch, formed on the head 18. As soon as the user applies a force that is greater than the predetermined torque of the flexible safety device 13, the screw 8 can be moved with respect to the nut 9 so as to screw or unscrew the interlocking system 7 to respectively press the portions 5, 6 against each other or on the contrary move them away from each other.

As soon as the first tooth of the toothing 15 has passed over the flexible catch 16, when screwing and unscrewing, the user will feel successive stable positions allowing them to be more aware of the rotational amplitude induced on the screw 8. The user does not feel the need to press the portions 5, 6 together with so much force, which avoids damaging the tapping 10 of the nut 9 and/or the thread 14 of the screw 8 but also the head 18 and the portions 5, 6.

Lastly, advantageously according to the invention, the flexible safety device 13 allows each screw 8 and nut 9 assembly to continue to be screwed and unscrewed regularly while avoiding, however, any accidental unscrewing of the screw 8 and nut 9 assembly to prevent the user from losing all or some of the decorative article 1 without noticing.

The invention is not limited to the embodiments and variants presented and other embodiments and variants will be clearly apparent to those skilled in the art. Thus, the embodiments and variants can be combined together without departing from the scope of the invention. As a non-limiting example, the flexible safety device 13 could comprise several toothing 15 and flexible catch 16 assemblies.

In addition, in particular each toothing 15 and flexible catch 16 assembly could comprise a single toothing 15 cooperating with several flexible catchs 16 or several stops 29 at the same time so as to elastically block the assembly over several teeth of the toothing 15.

Furthermore, the invention is not limited to a decorative jewellery or fine jewellery article 1. Thus, the invention could also be applied in other fields such as, for example, watchmaking, leather goods, tableware, firearms or writing instruments. Consequently, instead of a decorative article 1 forming a jewellery article or a fine jewellery article, according to the invention, the decorative article 1 could form, for example, a watchmaking article, a weaving article or a leather goods article.

The invention claimed is:

1. A decorative article comprising:
at least two portions of at least one part intended to be coupled together in order to be attached to a user, wherein the decorative article comprises an interlocking system comprising a screw and nut assembly which passes through each portion and is intended to press the two portions against each other by screwing, and wherein the interlocking system comprises a flexible safety device so that the screw and nut assembly can continue to be screwed and unscrewed whilst elastically preventing relative displacement between the screw and the nut below a predetermined torque.

2. The decorative article according to claim 1, wherein the flexible safety device comprises at least one toothing and flexible catch assembly mounted between the screw and the nut in order to provide a plurality of discrete relative positions in which relative displacement is prevented between the screw and the nut below a predetermined torque.

3. The decorative article according to claim 2, wherein the toothing is formed on the nut and the flexible catch is secured to the screw.

4. The decorative article according to claim 3, wherein the toothing extends circumferentially coaxially with the tapping of the nut.

5. The decorative article according to claim 3, wherein the flexible catch is mounted on the free end of the screw in the extension of the thread.

6. The decorative article according to claim 5, wherein the flexible catch is attached to the screw so as to rotate with the screw.

7. The decorative article according to claim 2, wherein the toothing is formed on the screw and the flexible catch is secured to the nut.

8. The decorative article according to claim 7, wherein the toothing extends circumferentially coaxially with the thread of the screw.

9. The decorative article according to claim 7, wherein the flexible catch is mounted protruding from the tapping of the nut.

10. The decorative article according to claim 9, wherein the flexible catch is attached to the nut so as to rotate with the nut.

11. The decorative article according to claim 2, wherein each toothing and flexible catch assembly comprises a toothing cooperating with several flexible catchs.

12. The decorative article according to claim 1, wherein the flexible safety device, below a predetermined torque less than 10 N mm, is configured so as to elastically maintain the position of the screw with respect to that of the nut in the unscrewing direction.

13. The decorative article according to claim 1, wherein the flexible safety device, above a predetermined torque greater than 1 N mm, is configured so as to allow the displacement of the screw with respect to that of the nut in the screwing direction.

14. The decorative article according to claim 1, wherein the predetermined torque of the flexible safety device in the screwing direction is equal to that in the unscrewing direction.

15. The decorative article according to claim 1, wherein the flexible safety device is active at different screwing penetrations of the screw and nut assembly in the screwing direction or in the unscrewing direction.

16. The decorative article according to claim 1, being made entirely or partially of a material based on at least one precious metal such as gold or platinum.

17. The decorative article according to claim 1, being a bracelet.

\* \* \* \* \*

UNITED STATES PATENT AND TRADEMARK OFFICE
CERTIFICATE OF CORRECTION

| | | |
|---|---|---|
| PATENT NO. | : 11,913,489 B2 | |
| APPLICATION NO. | : 18/257906 | |
| DATED | : February 27, 2024 | |
| INVENTOR(S) | : Marc Bole-Feysot, Franck Dumont and Sebastien Jeannier | |

It is certified that error appears in the above-identified patent and that said Letters Patent is hereby corrected as shown below:

On the Title Page

The Inventor item (72):
Change: Vercel-Vil-Ledieu-le-Camp
To: VERCEL-VILLEDIEU-LE-CAMP Signed and Sealed this
Thirtieth Day of April, 2024

*Katherine Kelly Vidal*

Katherine Kelly Vidal
*Director of the United States Patent and Trademark Office*